United States Patent
Malcolm et al.

(10) Patent No.: US 7,702,101 B2
(45) Date of Patent: Apr. 20, 2010

(54) SECURE PRESENTATION OF MEDIA STREAMS IN RESPONSE TO ENCRYPTED DIGITAL CONTENT

(75) Inventors: Michael A. Malcolm, Aspen, CO (US); Daniel A. Collens, Waterloo (CA); Stephen Watson, Toronto (CA); Paul Rechsteiner, Toronto (CA); Kevin Hui, Kitchener (CA)

(73) Assignee: Kaleidescape, Inc., Sunnyvale, CA (US)

( * ) Notice: Subject to any disclaimer, the term of this patent is extended or adjusted under 35 U.S.C. 154(b) by 951 days.

(21) Appl. No.: 10/616,899

(22) Filed: Jul. 9, 2003

(65) Prior Publication Data

US 2004/0088557 A1    May 6, 2004

Related U.S. Application Data

(63) Continuation-in-part of application No. 10/378,046, filed on Feb. 28, 2003, now Pat. No. 7,036,024, which is a continuation-in-part of application No. 10/377,266, filed on Feb. 28, 2003, now Pat. No. 7,188,248, which is a continuation-in-part of application No. 10/356,692, filed on Jan. 31, 2003, now Pat. No. 7,111,171, which is a continuation-in-part of application No. 10/356,322, filed on Jan. 31, 2003, now Pat. No. 7,003,131.

(60) Provisional application No. 60/394,630, filed on Jul. 9, 2002, provisional application No. 60/394,922, filed on Jul. 9, 2002, provisional application No. 60/394,588, filed on Jul. 9, 2002.

(51) Int. Cl.
*H04K 1/00* (2006.01)
*H04K 1/04* (2006.01)
*H04N 7/167* (2006.01)

(52) U.S. Cl. .................... 380/37; 380/26; 380/202; 380/239

(58) Field of Classification Search ............. 380/725, 380/212–220, 37, 27, 202, 239; 713/193; 705/50
See application file for complete search history.

(56) References Cited

U.S. PATENT DOCUMENTS 3,801,239 A * 4/1974 Larson ............... 418/61.3
(Continued)

FOREIGN PATENT DOCUMENTS

EP    792041 A2 *   8/1997
EP    1 199 647       4/2002
(Continued)

OTHER PUBLICATIONS

Alattar, A., G. Al-Regib. "Evaluation of Selective Encryption Techniques for Secure Transmission of MPEG-Compressed Bit-Streams." IEEE Symposium on Circuits and Systems, 1999, pp. 340-343.
(Continued)

*Primary Examiner*—Nasser G Moazzami
*Assistant Examiner*—Mohammad W Reza

(57) ABSTRACT

Secure presentation of media streams includes encoding the media streams into digital content, encrypting a portion of that digital content, the portion being required for presentation, in which the encrypted version is substantially unchanged in formatting parameters from the clear version of the digital content. Selecting those portions for encryption so there is no change in distribution of the media stream: packetization of the digital data, or synchronization of audio with video portions of the media stream. When encoding the media stream into MPEG-2, refraining from encrypting information by which the video block data is described, packet formatting information, and encrypting the video block data using a block-substitution cipher. A block-substitution cipher can be used to encrypt each sequence of 16 bytes of video data in each packet, possibly leaving as many as 15 bytes of video data in each packet in the clear.

34 Claims, 2 Drawing Sheets

U.S. PATENT DOCUMENTS

| | | | |
|---|---|---|---|
| 4,992,940 A | 2/1991 | Dworkin | |
| 5,335,277 A | 8/1994 | Harvey et al. | |
| 5,337,357 A | 8/1994 | Chou et al. | |
| 5,392,244 A | 2/1995 | Jacobson et al. | |
| 5,410,415 A | 4/1995 | Parulski et al. | |
| 5,457,791 A | 10/1995 | Matsumoto et al. | |
| 5,615,352 A | 3/1997 | Jacobson et al. | |
| 5,724,327 A | 3/1998 | Timmermans et al. | |
| 5,765,176 A | 6/1998 | Bloomberg | |
| 5,805,799 A | 9/1998 | Fredrickson et al. | |
| 5,896,454 A | 4/1999 | Cookson et al. | |
| 5,907,618 A * | 5/1999 | Gennaro et al. | 380/286 |
| 5,946,665 A | 8/1999 | Suzuki et al. | |
| 5,991,804 A | 11/1999 | Bolosky et al. | |
| 6,009,525 A | 12/1999 | Horstmann | |
| 6,029,195 A | 2/2000 | Herz | |
| 6,035,373 A | 3/2000 | Iwata | |
| 6,052,759 A | 4/2000 | Stallmo et al. | |
| 6,182,069 B1 | 1/2001 | Niblack et al. | |
| 6,192,139 B1 | 2/2001 | Tao | |
| 6,205,249 B1 | 3/2001 | Moskowitz | |
| 6,208,805 B1 | 3/2001 | Abecassis | |
| 6,236,727 B1 * | 5/2001 | Ciacelli et al. | 380/212 |
| 6,243,725 B1 | 6/2001 | Hempleman et al. | |
| 6,260,024 B1 | 7/2001 | Shkedy | |
| 6,304,942 B1 | 10/2001 | DeKoning | |
| 6,349,143 B1 | 2/2002 | Hastings et al. | |
| 6,366,910 B1 | 4/2002 | Rajaraman et al. | |
| 6,393,158 B1 | 5/2002 | Gould et al. | |
| 6,438,235 B2 | 8/2002 | Sims, III | |
| 6,460,023 B1 | 10/2002 | Bean et al. | |
| 6,463,426 B1 | 10/2002 | Lipson et al. | |
| 6,463,431 B1 | 10/2002 | Schmitt | |
| 6,473,867 B2 | 10/2002 | Yamamoto et al. | |
| 6,550,011 B1 | 4/2003 | Sims, III | |
| 6,618,035 B1 | 9/2003 | Reza | |
| 6,625,581 B1 | 9/2003 | Perkowski | |
| 6,629,097 B1 | 9/2003 | Keith | |
| 6,642,939 B1 | 11/2003 | Vallone et al. | |
| 6,658,391 B1 | 12/2003 | Williams | |
| 6,701,391 B1 | 3/2004 | Ayat et al. | |
| 6,772,340 B1 | 8/2004 | Peinado et al. | |
| 6,799,224 B1 | 9/2004 | Dellacona | |
| 6,801,999 B1 | 10/2004 | Venkatesan et al. | |
| 6,839,680 B1 | 1/2005 | Liu et al. | |
| 6,851,082 B1 | 2/2005 | Corbett | |
| 6,889,302 B2 | 5/2005 | Gibble et al. | |
| 6,889,383 B1 | 5/2005 | Jarman | |
| 6,904,151 B2 | 6/2005 | Deguillaume et al. | |
| 6,904,410 B1 | 6/2005 | Weiss et al. | |
| 6,948,067 B2 * | 9/2005 | Hawkes et al. | 713/168 |
| 6,957,232 B2 | 10/2005 | Hoeye et al. | |
| 6,959,020 B1 * | 10/2005 | Hourunranta et al. | 370/542 |
| 6,971,013 B2 | 11/2005 | Mihcak et al. | |
| 7,002,603 B2 | 2/2006 | Tapson | |
| 7,003,131 B2 | 2/2006 | Watson et al. | |
| 7,010,809 B2 * | 3/2006 | Hori et al. | 726/26 |
| 7,032,093 B1 | 4/2006 | Cameron | |
| 7,032,177 B2 | 4/2006 | Novak et al. | |
| 7,036,024 B2 | 4/2006 | Watson | |
| 7,076,737 B2 | 7/2006 | Abbott et al. | |
| 7,099,491 B2 | 8/2006 | Takaku | |
| 7,111,171 B2 | 9/2006 | Collens et al. | |
| 7,124,303 B2 * | 10/2006 | Candelore et al. | 713/193 |
| 7,151,831 B2 * | 12/2006 | Candelore et al. | 380/200 |
| 7,181,044 B2 | 2/2007 | Watson et al. | |
| 7,188,248 B2 | 3/2007 | Watson | |
| 7,231,607 B2 | 6/2007 | Neely et al. | |
| 7,246,322 B2 | 7/2007 | Neely et al. | |
| 7,257,732 B2 | 8/2007 | Zarnke et al. | |
| 7,287,168 B2 * | 10/2007 | Candelore et al. | 713/193 |
| 6,209,092 B1 | 3/2009 | Linnartz | |
| 2001/0037465 A1 | 11/2001 | Hart, III et al. | |
| 2001/0039659 A1 | 11/2001 | Simmons et al. | |
| 2001/0042043 A1 | 11/2001 | Shear et al. | |
| 2001/0051996 A1 | 12/2001 | Cooper et al. | |
| 2001/0056398 A1 | 12/2001 | Scheirer | |
| 2002/0002679 A1 | 1/2002 | Murakami et al. | |
| 2002/0029187 A1 | 3/2002 | Meehan et al. | |
| 2002/0054174 A1 | 5/2002 | Abbott et al. | |
| 2002/0085713 A1 | 7/2002 | Feig et al. | |
| 2002/0087876 A1 | 7/2002 | Larose | |
| 2002/0095582 A1 | 7/2002 | Peled et al. | |
| 2002/0106192 A1 * | 8/2002 | Sako | 386/94 |
| 2002/0116707 A1 | 8/2002 | Morris et al. | |
| 2002/0118299 A1 | 8/2002 | Kahn | |
| 2002/0138741 A1 | 9/2002 | Koch | |
| 2002/0150277 A1 | 10/2002 | Nishimoto et al. | |
| 2002/0169789 A1 | 11/2002 | Kutay et al. | |
| 2002/0172394 A1 | 11/2002 | Venkatesan et al. | |
| 2002/0174021 A1 | 11/2002 | Chu et al. | |
| 2002/0178077 A1 | 11/2002 | Katz et al. | |
| 2002/0178192 A1 | 11/2002 | Namioka | |
| 2002/0196939 A1 * | 12/2002 | Unger et al. | 380/216 |
| 2002/0196976 A1 | 12/2002 | Mihcak et al. | |
| 2003/0005295 A1 | 1/2003 | Girard | |
| 2003/0009671 A1 | 1/2003 | Yacobi et al. | |
| 2003/0012401 A1 | 1/2003 | Sharma et al. | |
| 2003/0014751 A1 | 1/2003 | Paek | |
| 2003/0018972 A1 | 1/2003 | Arora | |
| 2003/0030752 A1 | 2/2003 | Begeja | |
| 2003/0040850 A1 | 2/2003 | Najmi et al. | |
| 2003/0050818 A1 | 3/2003 | Maie | |
| 2003/0074253 A1 | 4/2003 | Scheuring et al. | |
| 2003/0078930 A1 | 4/2003 | Surcouf et al. | |
| 2003/0081857 A1 | 5/2003 | Tapson | |
| 2003/0084298 A1 | 5/2003 | Messerges et al. | |
| 2003/0107676 A1 | 6/2003 | Jang | |
| 2003/0110503 A1 | 6/2003 | Perkes | |
| 2003/0126599 A1 | 7/2003 | Novak et al. | |
| 2003/0131353 A1 | 7/2003 | Blom et al. | |
| 2003/0139971 A1 | 7/2003 | Rescigno et al. | |
| 2003/0163430 A1 | 8/2003 | Takaku | |
| 2003/0163466 A1 | 8/2003 | Rajaraman et al. | |
| 2003/0182297 A1 | 9/2003 | Murakami et al. | |
| 2003/0188182 A1 * | 10/2003 | Sato et al. | 713/193 |
| 2003/0191738 A1 | 10/2003 | Hoeye et al. | |
| 2003/0216956 A1 | 11/2003 | Smith et al. | |
| 2003/0231257 A1 | 12/2003 | Ochiai et al. | |
| 2004/0010692 A1 | 1/2004 | Watson | |
| 2004/0010694 A1 | 1/2004 | Collens et al. | |
| 2004/0037421 A1 | 2/2004 | Truman | |
| 2004/0039661 A1 | 2/2004 | Fuzell-Casey et al. | |
| 2004/0044593 A1 | 3/2004 | May | |
| 2004/0044658 A1 | 3/2004 | Crabtree et al. | |
| 2004/0049537 A1 | 3/2004 | Titmuss | |
| 2004/0073921 A1 | 4/2004 | Neely et al. | |
| 2004/0114049 A1 | 6/2004 | Arora | |
| 2004/0131184 A1 | 7/2004 | Wu | |
| 2004/0136698 A1 | 7/2004 | Mock | |
| 2004/0139064 A1 | 7/2004 | Chevallier et al. | |
| 2004/0151315 A1 | 8/2004 | Kim | |
| 2004/0166484 A1 | 8/2004 | Budke | |
| 2004/0166915 A1 | 8/2004 | Robarge | |
| 2004/0169683 A1 | 9/2004 | Chiu et al. | |
| 2004/0268017 A1 | 12/2004 | Uzrad-Nali et al. | |
| 2005/0004873 A1 | 1/2005 | Pou et al. | |
| 2005/0005191 A1 | 1/2005 | Judd | |
| 2005/0050103 A1 | 3/2005 | Kesteloot et al. | |
| 2005/0086069 A1 | 4/2005 | Watson et al. | |
| 2005/0091452 A1 | 4/2005 | Chen et al. | |
| 2005/0119977 A1 | 6/2005 | Raciborski | |
| 2005/0120053 A1 | 6/2005 | Watson | |
| 2005/0125405 A1 | 6/2005 | Watson | |

| | | | |
|---|---|---|---|
| 2005/0154892 | A1 | 7/2005 | Mihcak et al. |
| 2005/0182989 | A1 | 8/2005 | Zarnke et al. |
| 2005/0188280 | A1 | 8/2005 | Ali |
| 2005/0201726 | A1 | 9/2005 | Malcolm et al. |
| 2006/0004680 | A1 | 1/2006 | Robarts et al. |
| 2006/0031260 | A1 | 2/2006 | Minezaki et al. |
| 2006/0059098 | A1 | 3/2006 | Major et al. |
| 2006/0095300 | A1 | 5/2006 | Schrier et al. |
| 2007/0106901 | A1 | 5/2007 | Collens et al. |
| 2007/0118812 | A1 | 5/2007 | Kesteloot et al. |
| 2007/0240234 | A1 | 10/2007 | Watson |

FOREIGN PATENT DOCUMENTS

| | | |
|---|---|---|
| FR | 2 750 554 | 1/1998 |
| FR | 2 786 973 | 6/2000 |
| JP | 07-281293 | 10/1995 |
| JP | 2005-533410 | 11/2005 |
| JP | 2005-533416 | 11/2005 |
| JP | 2006-518063 | 8/2006 |
| JP | 2006-520944 | 9/2006 |
| WO | WO 01/37479 | 5/2001 |
| WO | WO 02/073378 | 9/2002 |
| WO | WO 02/075591 | 9/2002 |
| WO | WO 2004/006168 | 1/2004 |
| WO | WO 2004/006494 | 1/2004 |
| WO | WO 2004/006559 A2 | 1/2004 |
| WO | WO 2004/006579 | 1/2004 |
| WO | WO 2004/062945 | 7/2004 |
| WO | WO 2004/064293 | 7/2004 |
| WO | WO 2004/070585 | 8/2004 |
| WO | WO 2004/070998 | 8/2004 |
| WO | WO 2005/009024 | 1/2005 |
| WO | WO 2005/079375 | 9/2005 |
| WO | WO 2005/086985 | 9/2005 |
| WO | WO 2006/025833 | 3/2006 |
| WO | WO 2006/055938 | 5/2006 |

OTHER PUBLICATIONS

Alattar, A., G. Al-Regib, S. Al-Semari. "Improved Selective Encryption Techniques for Secure Transmission of MPEG Video Bit-Streams." International Conference on Image Processing, 1999, pp. 256-260.

Bhargava, B., C. Shui, S. Wang. "MEPG Video Encryption Algorithms." 2002, pp. 1-27, Kluwer Academic Publishers, http://raidlab.cs.purdue.edu/papers/mm.ps.

Blom, R., E. Carrara; D. McGrew, M. Naslund, K. Norrman, D. Oran. "The Secure Real-Time Transport Protocol." Internet Engineering Task Force AVT Working Group Internet-Draft, Jul. 2001, pp. 1-32, http://www.ietf.org/proceedings/01aug/I-D/draft-ietf-avt-srtp-01.txt.

Meyer, J., F. Gadegast. "Security Mechanisms for Multimedia-Data with the Example MPEG-I-Video." 1995, pp. 1-10, Tech. Uni. Of Berlin, http://www.gadegast.de/frank/doc/secmeng.pdf.

Parks, T., D. Kassay, C. Weinstein. "Security Implications of Adaptive Multimedia Distribution." IEEE International Conference on Communications, Jun. 1999, pp. 1-5, Vancouver, British Columbia, Canada, http://www.II.mit.edu/IST/pubs/icc99-parks/icc99.pdf.

Spanos, G., T. Maples. "Performance Study of a Selective Encryption Scheme for the Security of Networked, Real-Time Video." Proceedings of the $4^{th}$ International Conference on Computer Communications and Networks, Sep. 1995, pp. 2-10, Las Vegas, Nevada.

Tang, L. "Methods for Encrypting and Decrypting MPEG Video Data Efficiently." ACM Multimedia, 1996, pp. 219-229.

Zeng, W., S. Lei. "Efficient Frequency Domain Selective Scrambling of Digital Video." IEEE Trans. Multimedia, 2002, pp. 1-28.

Chu et al. "A Secure Multicast Protocol With Copyright Protection." ACM SIGCOMM Computer Comm. Review, Apr. 2002, entire document, vol. 32, No. 2.

Dittman. "Combining Digital Watermarks and Collusion Secure Fingerprints for Customer Copy Monitoring." Secure Images and Image Authentication, The Institution of Electrical Engineers, 2000, IEE, London.

Fridrich. "Copyright protection of digital images (authentication)." Feb. 18, 2003, http://www.ws.binghamton.edu/fridrich/Research'tutor2.ppt.

Izquierdo. "Using invariant image features for synchronization in spread spectrum image watermarking." EURASIP Journal on Applied Processing, 2002, Hindawi Publishing Corp., entire document. www.hindawi.com/PDF.aspx?pii=S1110865702000719.

Rey. "A survey of watermarking algorithms for image authentication." EURASIP Journal on applied processing, 2002, Hindawi Publ. Corp., www.hindawi.co.uk/access/get.php?journal=asp&volume=2002&pii=S1110865702204047.

* cited by examiner

SECURE PRESENTATION OF MEDIA STREAMS IN RESPONSE TO ENCRYPTED DIGITAL CONTENT

BACKGROUND OF THE INVENTION

1. Field of the Invention

The invention relates to presentation of media streams in response to digital content.

2. Related Art

Distribution of digital content representing media streams, such as for example movies, is subject to several problems. One problem is that it is easy to make exact copies of digital content, thus allowing any recipient of that content to redistribute it, whether authorized or not. It would be advantageous to be able to distribute digital content, particularly digital content representing media streams, without fear of its unauthorized distribution. This would be particularly advantageous when it is desired to distribute digital content using a communication link, such as for example a computer network or other technique for distribution to end viewers (for example, either on demand, in anticipation of future demand, or in response to something else).

One known solution is to encrypt the digital content that represents the media stream, so that a recipient of that digital content cannot easily redistribute it in a readily presentable (that is, unencrypted) format to unauthorized recipients. However, even when digital content is distributed in an encrypted form, it must be decrypted before it can be presented to a viewer. Thus, there is at least some time for each movie, during distribution from originator to viewer, during which that movie is available in an unencrypted format (herein sometimes also called "in the clear"). At times, and in places in any presentation system, when that movie is available in the clear, that movie is vulnerable to security attacks. For example, an unauthorized person might copy the movie in its unencrypted format and distribute or use it without authorization.

Accordingly, it would be advantageous to provide a method (and devices for performing it) by which the digital content can be used for presentation as a media stream, without exposing that digital content in the clear. However, there are several issues related to achieving this goal.

It would be desirable for the device to be relatively tamper-resistant, so that the work factor for obtaining the digital content in the clear would be substantially greater than simply purchasing copies (or at least, greater than other possibly available techniques for unauthorized procurement).

It would also be desirable for the device to expose the digital content representing the media stream as little as possible. For some examples, having the digital content (or a key from which that digital content could be obtained) in the clear in a memory would be less desirable than only having the digital content in the clear on an internal bus, which itself would be less desirable than only having the digital content in the clear when actually presented on a screen for viewing by an end-user.

These issues present a need for separating that part of the device that has access to keys for decryption into a separate set of "trusted" hardware and software elements, with the effect that it would be advantageous for at least some of the device to be implemented in tamper-resistant hardware operating under control of verified software.

It would be desirable for the device to be able to both decode digital content representing media streams, and to provide common playback functions known for media streams, without these functions involving complete decryption of the digital content. These functions might include navigation within the digital content (such as for example fast-forward and rewind functions), content selection within the digital content (such as for example chapter-skip and multi-angle selection functions), or manipulation of the presentation (such as for example freeze-frame or single-frame-advance functions).

It would be desirable for the device to be able to provide access to metadata about the one or more media streams, such as a title or rating, or other information about the media streams for which it is generally acceptable to maintain that information in the clear, without these functions involving complete decryption of the digital content.

It would be desirable for the device to be able to provide differing access to distinct end-users for selected portions of one or more media streams, such as for example differing access to audio versus video, or English-language versus French-language versions, or US releases versus UK releases, or "airline" versions versus "general release" versions, for the same media stream, without these functions involving complete decryption of the digital content.

It would be desirable for these playback functions, and possibly others, to be implemented in relatively unverified software. In one embodiment, only verified hardware or software would be allowed access to keys for decrypting the digital content. However, there are many such functions for which it would be desirable to have them be available to the user, without having those functions be implemented in tamper-resistant hardware (which would be more expensive, and would be difficult to update), or in verified software (which would also be more difficult to update, and might also be more expensive to create).

Formats now used for encoding digital content representing a media stream for digital distribution (such as for example MPEG-1, MPEG-2, and MPEG-4) are relatively complex. These formats provide for dividing up the digital content into multiple packets. Thus, it is possible when parsing digital content representative of media streams, that encryption might involve maintaining substantial state information across many such packets. A device able to conduct both the parsing and stitching operations might need substantial working memory. In general, having to maintain less state across packet boundaries would allow the hardware and software for decoding and decrypting the encoded and encrypted movie to be simpler, and would allow the digital content for the movie to be less exposed in the clear.

Formats used for encoding digital content representing media streams also provide for partial delivery of portions of the digital content at different times, such as when sending the digital content is interrupted and later restarted, or when packets including portions of the digital content arrive out of order, or with parts missing. Similar to the problem involving multiple packets, a device able to recover from partial delivery of only a portion of the digital content might need to maintain substantial state, or to maintain substantial working memory. In general, having to maintain less state across packet boundaries would allow the hardware and software for decoding and decrypting the encoded and encrypted movie to be more robust with regard to handling packets that arrive out of order, or with parts missing.

Formats used for encoding digital content representing media streams provide for additional information about the media stream, such as a title, for which it might be advantageous to have available even when the media stream is not actually being presented to the viewer. For example, it might be advantageous to allow a potential viewer to browse titles and related information, or even to conduct a computerized search on that information, without actually presenting the media stream. A device able to provide that information rapidly, such as on a random access basis with regard to the digital content representing that media stream, would involve substantial resources for computation and memory, likely relatively proportionate to the amount of the digital content desired to be reviewed on a random access basis, with the effect that such a device would thus be relatively insecure against attack, as either decryption keys or digital content in the clear would be available to those parts of the system for which such random access were desired.

Accordingly, it would be advantageous to provide an improved technique for presentation of digital content representing a media stream, such as the technique in which devices able to access the digital content are not allowed access to the media stream represented by that digital content, but still are allowed access to metadata regarding that media stream.

SUMMARY OF THE INVENTION

A method of secure presentation of media streams in response to encrypted digital content includes (1) encoding the media stream into a digital content format representing that media stream, (2) encrypting a portion of that digital content, less than the entire digital content format representing that media stream, the portion of the digital content that is encrypted being required for presentation of the media stream, (3) in which the encrypted version of the digital content is substantially unchanged in formatting parameters from the clear version of the digital content.

Formats used for encoding digital content representing media streams provide for encapsulating information in a hierarchy of layers, each relatively higher-level layer representing an abstraction for which each relatively lower-level layer represents an implementation thereof. As described herein, in an aspect of the invention, the highest-level layer (or multiple higher-level layers) represent audio and video information for the media stream, while relatively lower-level layers represent techniques by which that information is broken into packets, indexed, multiplexed, and supplemented with metadata (such as for example closed captioning and copyright information). As described herein, in an aspect of the invention, only the audio and video information for the media stream is encrypted, while other relatively lower-level layers remain "in the clear" (that is, unencrypted).

More generally, formats used for encoding digital content representing media streams provide a tree-structure in which information is disposed, the audio and video data being incorporated into leaves of the tree and various types of metadata (such as for example control information) being incorporated into branches of the tree. After reading this application, those skilled in the art will recognize that a tree structure is not the only possible format, and that in general, any partial ordering of information might be specified by a format used for encoding digital content representing media streams, where the audio or video data are specified to have a selected ordering with regard to metadata for that digital content.

As described herein, in an aspect of the invention, where that format used for encoding the digital content can be represented as a tree, it suffices for a subtree of the digital content closed root-ward to be unencrypted. In this context, "closed root-ward" describes the case where if a node X in the tree T is included in a set of nodes (and thus unencrypted), so is every node in a path from X toward the root of the tree T. In one embodiment, substantially all the leaves of the tree T are encrypted, and the system is still able to parse the MPEG stream, with the only limitation being that the system cannot present the actual audio or video without decryption of those leaves.

Similarly, where that format used for encoding the digital content can be represented as a partial ordering, it suffices for a portion of that partial ordering closed backward under that partial ordering to be unencrypted. In this context, "closed backward" describes the case where if an element X in the partial ordering P is included in a set of elements (and thus unencrypted), so is every element Y for which Y<X in the partial ordering P. In one embodiment, substantially all the audio and video elements of the partial ordering P are encrypted, and the system is still able to parse the MPEG stream, with the only limitation being that the system cannot present the actual audio or video without decryption of those audio and video elements.

More generally, in this context "encrypted" and "unencrypted" can be replaced with distinct levels of hardness to decode the associated elements X and Y without having a presentation device key. For one example, not intended to be limiting in any way, the audio and video elements of the tree T (or the partial ordering P) might be encrypted using the AES-128 block cipher, while the control elements, MPEG packet headers, and MPEG pack headers might be encrypted using a substantially less secure technique, such as a bitwise XOR with a selected password. As described above, so long as the less-strongly encrypted portions form a collection that is closed root-ward (for a tree T) or closed backward (for a partial ordering P), the system will be able to parse the MPEG stream in relatively non-secure hardware and software, while still being limited to a relatively secure portion with the appropriate key to present audio and video.

After reading this application, those skilled in the art will recognize that more generally, "encryption" can be replaced by any security technique, such as for example physical hardware security such as hidden mask layers in a ROM or ASIC. For one example, multiple levels of security might include (a) a first level readable like a file in a computer; (b) a second level readable only by coupling a probe to an external port of the presentation device, (c) a third level readable only by coupling a probe to an internal bus of the presentation device, (d) a fourth level readable only by emulation of the circuitry of the presentation device, and (e) a fifth level readable only by reverse engineering of the integrated circuit and examination with an electron microscope.

An aspect of the method includes selecting those portions of the digital content for encryption so that there is no substantial change in distribution of the digital content representing the media stream, such as for example (1) packetization of the digital data, or (2) synchronization of audio with video portions of the media stream. In a preferred embodiment, unchanged distribution can be accomplished by making no substantial change in length of portions of the video packet data, such as for example individual packets of an MPEG-encoded movie.

In one embodiment, the method includes, when encoding the media stream into a digital content format, such as for example MPEG-2, (1) refraining from encrypting information by which the video packet data is described, such as for example packet formatting information, and (2) encrypting the video packet data using a block-substitution cipher. For example, a block-substitution cipher can be used to encrypt each sequence of 16 bytes of video data in each packet, possibly leaving as many as 15 bytes of video data in each packet in the clear. In one embodiment, the method includes (3) separately encrypting the audio portion of the media streams, and possibly other selected data portions of the media streams, within the digital content, with the effect that these separate data portions of the media streams might be made differently available to distinct selected users or groups of users.

The invention is not restricted to movies, but is also applicable to other media streams, such as for example animation or sound, as well as to still media, such as for example pictures or illustrations, and to databases and other collections of information.

INCORPORATED DISCLOSURE

Figure 1:
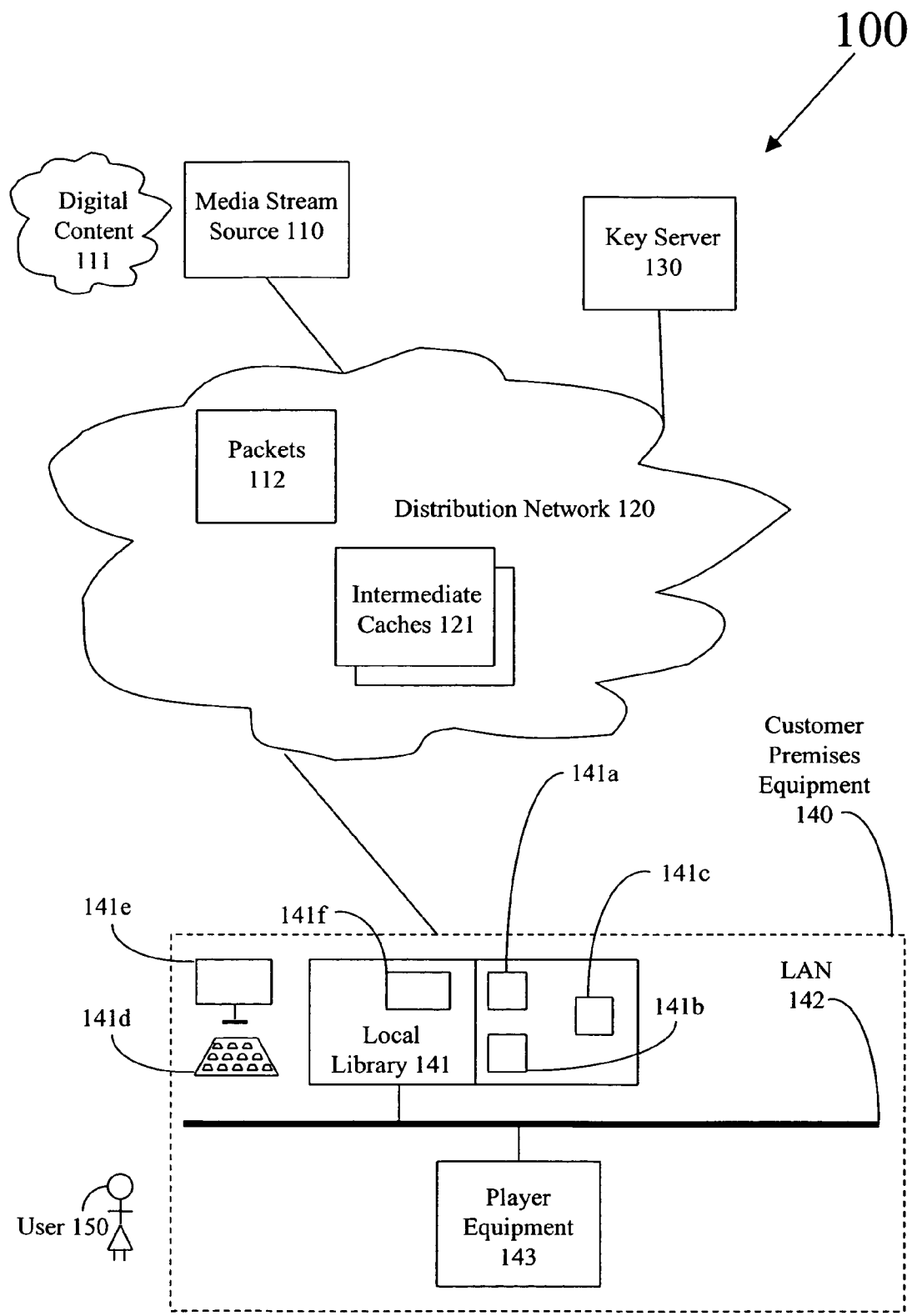
FIG. 1 shows a block diagram of a system for secure presentation of media streams in response to encrypted digital content.

This application claims priority of the following documents, each of which is hereby incorporated by reference as if fully set forth herein.

- U.S. provisional patent application 60/394,630, filed Jul. 9, 2002, in the name of Michael Malcolm, Stephen Watson, Daniel Collens, and Kevin Hui, titled "Watermarking and Fingerprinting a Movie for Secure Distribution."
- U.S. provisional patent application 60/394,922, filed Jul. 9, 2002, in the name of Michael Malcolm, Stephen Watson, and Daniel Collens, titled "System Architecture of a System for Secure Distribution of Media."
- U.S. provisional patent application 60/394,588, filed Jul. 9, 2002, in the name of Michael Malcolm, Stephen Watson, and Daniel Collens, titled "Topology of Caching Nodes in a System for Secure Delivery of Media Content."
- U.S. patent application Ser. No. 10/356,692, filed Jan. 31, 2003, in the name of Daniel Collens, Stephen Watson, and Michael Malcolm, titled "Parallel Distribution and Fingerprinting of Digital Content".
- U.S. patent application Ser. No. 10/356,322, filed Jan. 31, 2003, in the name of Stephen Watson, Daniel Collens, and Kevin Hui, titled "Watermarking and Fingerprinting Digital Content Using Alternative Blocks to Embed Information".
- U.S. patent application Ser. No. 10/377,266, filed Feb. 28, 2003, in the name of Stephen WATSON, titled "Recovering from De-Synchronization Attacks Against Watermarking and Fingerprinting".
- U.S. patent application Ser. No. 10/378,046, filed Feb. 28, 2003, in the name of Stephen WATSON, titled "Detecting Collusion Among Multiple Recipients of Fingerprinted Information".
- U.S. patent application Ser. No. 10/616,698, filed this same day, in the name of Stephen WATSON, Michael MALCOLM, and Daniel COLLENS, titled "Content and Key Distribution System for Digital Content Representing Media Streams".

These documents are hereby incorporated by reference as if fully set forth herein, and are sometimes referred to herein as the "incorporated disclosure".

Inventions described herein can be used in combination or conjunction with technology described in the incorporated disclosure.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The general meaning of each of these following terms is intended to be illustrative and in no way limiting.

- The phrase "media stream" describes information intended for presentation in a sequence, such as motion pictures including a sequence of frames or fields, or such as audio including a sequence of sounds. As used herein, the phrase "media stream" has a broader meaning than the standard meaning for "streaming media," (of sound and pictures that are transmitted continuously using packets and that start to play before all of the content arrives). Rather, as described herein, there is no particular requirement that "media streams" must be delivered continuously. Also as described herein, media streams can refer to other information for presentation, such as for example animation or sound, as well as to still media, such as for example pictures or illustrations, and also to databases and other collections of information.

- The phrase "digital content" describes data in a digital format, intended to represent media streams or other information for presentation to an end viewer. "Digital content" is distinguished from packaging information, such as for example message header information. For the two phrases "digital content" and "media stream," the former describes a selected encoding of the latter, while the latter describes a result of presenting any encoding thereof.

- The phrase "embedded information in a media stream" describes information incorporated into a set of digital content representing that media stream, in a form capable of later detection. For example, digital content representing media streams might include embedded information, such that the media streams are still capable of presentation to a viewer without substantial change, but in which the embedded information can be recovered by suitable processing of the digital content.

- The phrase "embedding information in a media stream" describes generating a set of digital content representing that media stream, for which the digital content both represents the media stream and also includes the embedded information in a form capable of later detection.

- The term "watermark" describes a schema for digital content by which information can be embedded into that digital content. In preferred embodiments, as described in related applications, an attacker cannot easily remove the watermark. However, the concept of a watermark as described herein is sufficiently general to include watermarks that are not so resistant to attack, or which use other techniques for embedding information.

The term "fingerprint" and the phrase "embedded identifying information" describe sets of information sufficient to identify at least one designated recipient of digital content. In a preferred embodiment, as described in a related application, multiple attackers colluding together cannot easily remove the fingerprint provided by the invention, or prevent at least one of them from being detected as unauthorized distributor of the digital content. However, the concept of the fingerprint as described herein is sufficiently general to include fingerprints that are not so resistant to removal, or do not provide such capability for detecting unauthorized distributors of the digital content, or which use other techniques for embedding information, for detecting the embedded information, or for detecting unauthorized distributors of the digital content. As described in the incorporated disclosure and in related applications, a "watermark" refers to a set of locations in a media stream at which information might be embedded, while a "fingerprint" refers to the actual information that is embedded, such as for example by selecting a block or alt-block for each such location. However, in the context of the invention, there is no requirement that the concepts of watermarking and fingerprinting be so restricted. More generally, a watermark might be used for any technique by which a source of the digital content for the media stream might be identified, or a fingerprint might be used for any technique by which a recipient of the digital content for the media stream might be identified. For example, not intended to be limiting in any way, watermarking and fingerprinting information as described herein includes a representation of the entire path (or set of paths) by which the digital content representing the media stream was sent from its source and received by its end viewer (or equipment associated therewith).

The phrase "identifying information" describes, generally, either information associated with a watermark, information associated with a fingerprint, or other information by which authorized or unauthorized distribution of digital content representing a media stream might be identified.

The phrases "original movie" and "alt-movie" describe alternative versions of the same media stream, such as one being an original version of that media stream introduced into a system using aspects of the invention, and another being an alternative version of that same media stream generated in response to the original movie. Similarly, the phrases "original block" and "alt-block" describe alternative versions of the same individual block or macroblock within the original movie or alt-movie. As described in a related application, a difference between the original movie and the alt-movie is historical, in that the alt-movie can be substituted for the original movie in nearly every respect. Similarly, a difference between any one original block and its associated alt-block is historical, in that the alt-block can be substituted for the original block in nearly every respect.

The phrases "original digital content" and "altered digital content" (or in the latter case, "post-attack digital content") describe digital content representing media streams, in a first format (original digital content) and in a second format (altered digital content), the altered digital content having been produced in response to the original digital content and with the intent of representing substantially similar media streams, but with the effect that detecting identifying information from the original digital content is made relatively difficult. Thus, the altered digital content is a result of a de-synchronization attack on the original digital content. In preferred embodiments, the original digital content might be an actual original of some digital content before it was subject to a de-synchronization attack, or might be a constructed form of digital content, such as in response to an original movie and alt-movie, or in response to a set of original blocks and alt-blocks. For one example, not intended to be limiting in any way, the original digital content might be an average of the original movie and the alt-movie, or there might be two sets of original digital content, one for the original movie and one for the alt-movie. In one embodiment, a typical case of original digital content will include a block-by-block selection from the blocks of the original movie and the alt-movie. However, in the context of the invention, there is no particular restriction to such formats being used or included as the "original digital content" for which resynchronization is sought. Moreover, as described below, numerous variations on this theme are all within the scope and spirit of the invention, and would be workable without undue experimentation or further invention.

The phrase "end viewer" describes a recipient of the media stream for whom decoding of the digital content representing the media stream, and presentation of the media stream, is contemplated.

The term "decoding" describes generating data in a form for presentation of the media stream, in response to the digital content representing the media stream in an encoded format. As described herein, the encoded format might include an industry standard encoded format such as MPEG-2. However, the concept of decoding as described herein is sufficiently general to include other encoding formats for media streams.

The term "presentation" describes generating information in a form for viewing of the media stream, such as for example audio and visual information for viewing a movie. As described herein, presentation of a movie might include visual display of the frames or fields of motion picture, as well as audio presentation of a soundtrack associated with that motion picture. However, the concept of presentation as described herein is sufficiently general to include a wide variety of other forms of generating information for viewing.

The term "packet" describes a portion of the digital content representing a media stream, such as for example as might be separately identifiable within that digital content 111 or transmitted when sending that digital content. In one embodiment, a "packet" indicates a contiguous sub-region of an MPEG-2 packet including picture slice data. In the context of the invention, a "packet" is not necessarily the same as an MPEG-2 packet, and a "packet" is not necessarily the same as a TCP/IP packet.

Other and further applications of the invention, including extensions of these terms and concepts, would be clear to those of ordinary skill in the art after purchasing this application. These other and further applications are part of the scope and spirit of the invention, and would be clear to those of ordinary skill in the art without further invention or undue experimentation.

The scope and spirit of the invention is not limited to any of these definitions, or to specific examples mentioned therein, but is intended to include the most general concepts embodied by these and other terms.

System Elements

FIG. 1 shows a block diagram of a system for secure presentation of media streams in response to encrypted digital content.

A system 100 includes a media stream source 110, a distribution network 120, a key server 130, and a set of customer premises equipment 140. The system 100 is disposed for presenting one more media streams, as represented by digital content associated with those media streams, to one or more particular selected users 150.

The media stream source 110 is capable of injecting a set of digital content 111, in the form of a sequence of packets 112, the sequence of packets 112 including digital content for at least one media stream intended for a user 150 of the system 100. In one embodiment, there might be more than one media stream source 110, and the media stream sources 110 are capable of injecting copies of the digital content adapted to particular selected users 150.

The distribution network 120 is disposed for transferring information between and among the media stream source 110, the key server 130, and the customer premises equipment 140. In one embodiment, the distribution network 120 includes a set of intermediate caches or sources 121, capable of receiving packets 112 from the media stream sources 110, caching or otherwise maintaining in storage information from those packets 112, and further adapting the digital content associated with those packets 112 to particular selected users 150.

Those skilled in the art will recognize, after perusal of this application, that the system 100, including the media stream source 110, the distribution network 120, and the intermediate caches or sources 121, are preferably disposed for adapting and encrypting the digital content 111 (as further described with regard to distribution of digital content representing media streams) as described in the incorporated disclosure, such as for example in the documents "Watermarking and Fingerprinting a Movie for Secure Distribution," "System Architecture of a System for Secure Distribution of Media," "Topology of Caching Nodes in a System for Secure Delivery of Media Content," "Parallel Distribution and Fingerprinting of Digital Content," and "Watermarking and Fingerprinting Digital Content Using Alternative Blocks to Embed Information."

As further described herein, in one embodiment, not intended to be limiting in any way, the digital content 111 is encoded using an MPEG-2 encoding scheme, with selected portions of that digital content 111, representative of the media stream, encrypted as described in the incorporated disclosure, such as for example in the documents "Watermarking and Fingerprinting a Movie for Secure Distribution," "System Architecture of a System for Secure Distribution of Media," "Topology of Caching Nodes in a System for Secure Delivery of Media Content," "Parallel Distribution and Fingerprinting of Digital Content," and "Watermarking and Fingerprinting Digital Content Using Alternative Blocks to Embed Information." The selected portions of that digital content 111 preferably include only the portions of the digital content 111 representative of the presentable or displayable portions of the media stream, and preferably do not include any formatting data, metadata, or other descriptive data relating to the media stream, even if embedded in the encoded digital content 111 representative of that media stream.

As further described herein, in one embodiment, not intended to be limiting in any way, those portions of the digital content 111 are encoded with the effect that the sequence of packets 112 is substantially unchanged from an alternative sequence of packets 112 that might have been generated for the digital content 111, had that digital content 111 not been encrypted for distribution to the user 150. For example, this has the effect that the length of each packet 112 in the sequence of packets 112 is substantially unchanged from an alternative sequence of packets 112 that might have been generated for the digital content 111 had that digital content 111 not been encrypted for distribution to the user 150. This has the effect that the amount of intermediate state maintained for decoding that sequence of packets 112, and thus for decoding that digital content 111, is substantially unchanged from an alternative sequence of packets 112 that might have been generated for the digital content 111, had that digital content 111 not been encrypted for distribution to the user 150.

As further described herein, in one embodiment, not intended to be limiting in any way, those portions of the digital content 111 are encoded with the effect that synchronization of audio with video within the digital content 111 is substantially unchanged from an alternative operation of synchronization of audio with video within the digital content 111 that might have been performed for that digital content 111, had that digital content 111 not been encrypted for distribution to the user 150. This has the effect that the degree of effort involved in decoding that digital content 111, any decoding steps involving synchronization of audio with video, are relatively equivalent to the degree of effort involved in an operation of synchronization of audio with video within the digital content 111 that might have been generated for the digital content 111, had that digital content 111 not been encrypted for distribution to the user 150.

As further described herein, in one embodiment, not intended to be limiting in any way, those portions of the digital content 111 are encoded with the effect that locating (or "seeking to") a selected position in a position in the media stream represented by the digital content 111 is substantially unchanged from an alternative operation of locating (or "seeking to") a selected position in a position in the media stream represented by the digital content 111 that might have been performed for that digital content 111, had that digital content 111 not been encrypted for distribution to the user 150. This has the effect that the degree of effort involved in an operation of locating (or "seeking to") a selected position in a position in the media stream represented by the digital content 111 is substantially unchanged from an alternative operation of locating (or "seeking to") a selected position in a position in the media stream represented by the digital content 111 that might have been performed for that digital content 111, had that digital content 111 not been encrypted for distribution to the user 150.

Moreover, as further described herein, in one embodiment, not intended to be limiting in any way, in the context of the invention, it is not necessary to decrypt portions of the digital content 111 to perform an operation of locating (or "seeking to") a selected position in a position in the media stream represented by the digital content 111. After reading this application, those skilled in the art would recognize that the operation of locating (or "seeking to") a selected position in a position in the media stream represented by the digital content 111 might thus be performed relatively more efficiently (that is, without substantial additional encryption steps) and relatively more securely (that is, by relatively less trusted hardware or software components). In one embodiment, those portions of the digital content 111, in an MPEG-2 encoding of that digital content 111, useful for that operation of locating (or "seeking to") a selected position in a position in the media stream are not encrypted.

As further described herein, in one embodiment, not intended to be limiting in any way, within the digital content 111, only the video block data is encrypted, preferably using a block-substitution cipher, preferably a variation of the AES cipher, such as for example AES128 or AES-256. In one embodiment, the block-substitution cipher can be used to encrypt each sequence of 16 bytes of video block data in each packet 112, with the fact that as many as 15 bytes of video block data within each packet 112 might remain in the clear after encryption.

In one embodiment, the digital content 111 is encoded using MPEG-2, which includes its audio and video data (as well as control data) within an MPEG "packet." MPEG packets are enclosed by MPEG-2 within an MPEG "pack." The MPEG standard is further described in documents known in the digital video industry. This has the effect that, in such embodiments, only audio or video data is encrypted (but not necessarily all audio and video data is encrypted), while substantially all of the MPEG control data (including MPEG packet headers, MPEG pack headers, and in general all types of MPEG control data), is left unencrypted. This also has the effect that, in such embodiments, only MPEG packet payloads are encrypted.

In such embodiments, where an MPEG packet includes a payload that is not an integer multiple of the encryption size (16 bytes), any remainder, possibly as many as 15 bytes, is also left unencrypted. This has the effect that, in such embodiments, at least some packets 112 might include packet header information (unencrypted), MPEG control data (unencrypted), audio or video data that is encrypted, and possibly as many as 15 bytes of audio or video data that is left unencrypted.

In such embodiments, where the MPEG data has already been encrypted with another technique (such as for example CSS, which might be in use for selected DVD physical media carrying the MPEG data), those packets 112 already encrypted with the other technique are not further encrypted using the AES cipher. Those skilled in the art will recognize that because the CSS specification provides that no more than 50% of sectors of a DVD video disk are encrypted using CSS, this has the effect that as many as 50% of sectors of the DVD video disk would remain to be possibly encrypted using the AES cipher.

In such embodiments, those data elements of the MPEG packet that have been encrypted are maintained as offsets into the MPEG pack information and MPEG packet information. This has the effect that, although the MPEG pack information and MPEG packet information have variable-length headers, the encrypted data elements can still be located relative to the end of those headers.

As further described herein, in one embodiment, not intended to be limiting in any way, within the digital content 111, separable media streams, such as for example an audio stream distinguishable from the video stream, are preferably separately encrypted, with the effect that the separable media streams might be made differently available to distinct particular selected users 150, or distinct groups of particular selected users 150.

The key server 130 is capable of supplying, such as for example in response to a request from the user 150, digital information including decryption keys (whether symmetric keys, or asymmetric keys such as used in public key cryptosystems) and license information to particular selected users 150.

The customer premises equipment 140 includes a local library 141, a local area network 142, and a set of player equipment 143. The customer premises equipment 140 is disposed for presenting one or more media streams, as represented by digital content included in the sequence of packets 112, to one or more particular selected users 150 associated with the particular selected customer premises equipment 140.

The local library 141 includes a processor 141a, program and data memory or mass storage 141b, and a formatted-media reader 141c. In one embodiment, the local library 141 also includes at least one input element 141d and at least one output element 141e. The memory or mass storage 141b is capable of including instructions 141f capable of being executed or interpreted by the processor 141a to perform steps as described herein. The memory or mass storage 141b is also capable of maintaining copies of at least portions of the digital content 111, possibly watermarked or fingerprinted as described in the incorporated disclosure.

As described below, the instructions 141f direct the local library 141 to perform the following actions:

(A1a) to receive digital content 111 from the media stream source 110, using the format of the sequence of packets 112, or (A1b) to receive digital content 111 from the formatted-media reader 141c;

In the event that the digital content 111 is received from the formatted-media reader 141c, that digital content 111 might either be (1) already encrypted on the physical media being read by the device, (2) unencrypted on the physical media being read by the device, or (3) encrypted on the physical media being read by the device, but using a non-preferred encryption technique. In case 2, the digital content 111 is encrypted by the formatted-media reader 141c, or by an supplemental device coupled thereto, before transferring any digital content 111 to devices other than the formatted-media reader 141c. In case 3, the digital content 111 is decrypted using the non-preferred encryption technique, and re-encrypted using a preferred encryption technique, before transferring any digital content 111 to devices other than the formatted-media reader 141c.

(A2) (optionally) to partially decode that digital content 111, with the effect of retrieving at least some metadata regarding that digital content 111 in the clear, such as for example index files including pointers into the digital content 111;

(A3) to maintain that encrypted digital content 111, and optionally at least some decrypted metadata regarding that digital content 111, in the memory or mass storage 141b; and (A4) to decode that digital content 111, with the effect of retrieving metadata regarding that digital content 111 in the clear, and with the effect of retrieving data representing presentable portions of the media stream represented by that digital content 111 in an encrypted form;

(A5) to transfer that encrypted digital content 111 from the memory or mass storage 141b to the local network 142 and to the player equipment 143; and (A6) to decrypt selected portions of that digital content 111, in response to requests from the player equipment 143, with the effect of retrieving, in the clear but secure from detection or intrusion, data represented by that digital content 111 for presenting a media stream at the player equipment 143.

The specific techniques to be applied are further described below.

As described below, the player equipment 143 performs the following actions:

(B1) receives the decoded digital content 111 from the memory or mass storage 141*b* and the local network 142;

(B2) receives a set of commands or requests from the user 150;

(B3) performs those commands or requests from the user 150 capable of being performed without reference to encrypted elements of the decoded digital content 111, without performing any decryption on that decoded digital content 111; and (B4) presents or displays those elements of the decoded digital content 111 that involve decrypting elements (such as audio or video blocks) of that decoded digital content 111, using one or more decryption keys from the key server 130.

The specific techniques to be applied are further described below.

Method of Operation

Figure 2:
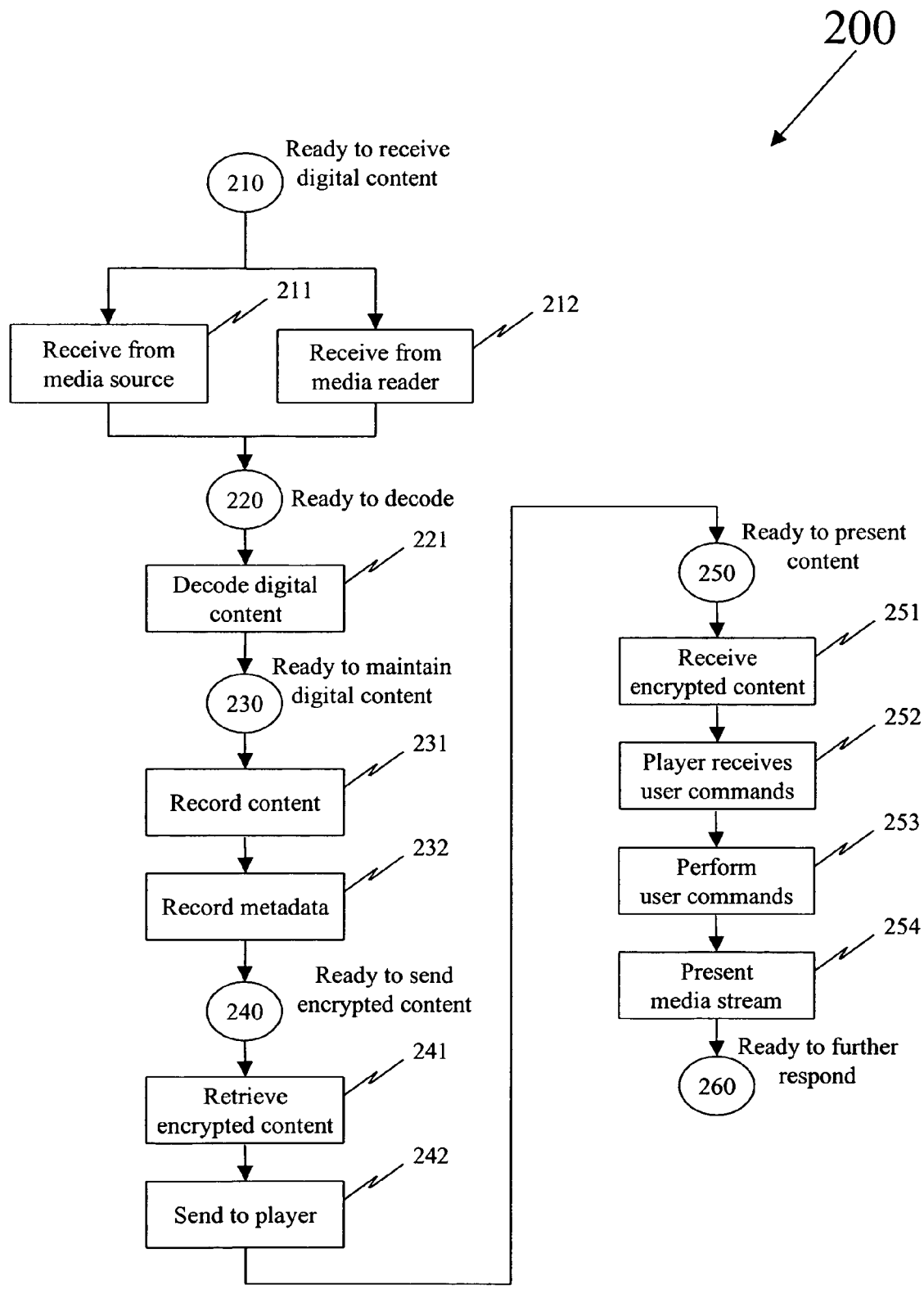
FIG. 2 shows a process flow diagram of a method for secure presentation of media streams in response to encrypted digital content.

FIG. 2 shows a process flow diagram of a method for secure presentation of media streams in response to encrypted digital content.

Although described serially, the flow points and method steps of the method 200 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

At a flow point 210, the local library 141 is ready to receive digital content 111 representing one or more media streams. The method 200 performs either the step 211 (receiving digital content 111 from the media stream source 110), or the step 212 (receiving digital content 111 from the formatted-media reader 141*c*).

At a step 211, the local library 141 receives digital content 111 representing one or more media streams from the media stream source 110. As part of this step, the local library 141 receives a sequence of one or more packets 112, collectively including the digital content 111. As part of this step, the local library 141 might be required to request retransmission of lost or broken packets 112, might be required to reorder packets 112 delivered out of sequence, and might be required to re-establish a connection with the media stream source 110 to continue receiving from a known breakpoint. As a result of this step, the local library 141 obtains at least a portion of the digital content 111 representing one or more media streams, and the method 200 is able to proceed at the flow point 220.

At a step 212, the local library 141 receives digital content 111 representing one or more media streams from the formatted-media reader 141*c*. As part of this step, the local library 141 receives data directly from the formatted-media reader 141*c* or from a supplemental device coupled thereto. That data might be delivered in a sequence of one or more packets 112, in a similar manner to performance of the step 211, or might be delivered by another technique, such as for example a DMA transfer. As noted above, that digital content 111 might either be already encrypted, unencrypted, or encrypted using a non-preferred encryption technique. As part of this step, as noted above, the digital content 111 is ultimately transformed into a format using a preferred encryption technique before being transferred to any devices other than the formatted-media reader 141*c*. As a result of this step, the local library 141 obtains at least a portion of the digital content 111 representing one or more media streams, and the method 200 is able to proceed at the flow point 220.

At a flow point 220, the local library 141 is ready to partially decode the digital content 111. Steps following this flow point are optionally performed as part of the method 200.

At a step 221, the local library 141 partially decodes the received digital content 111, with the effect of obtaining, in the clear, at least some metadata regarding that digital content 111. In one embodiment, the metadata obtained in the clear includes at least one index file including pointers to selected locations within the media stream represented by the digital content 111. The method 200 is able to proceed at the flow point 230.

At a flow point 230, the local library 141 is ready to maintain digital content 111 in the memory or mass storage 141*b*.

At a step 231, the local library 141 records the digital content 111 in the memory or mass storage 141*b*.

At a step 232 (if the steps following the flow point 220 were performed), the local library 141 records any metadata obtained in response to the digital content 111 in the memory or mass storage 141*b*.

As a result of performing the steps following the flow point 230, the local library 141 is able to retrieve the encrypted digital content 111, and optionally at least some unencrypted metadata associated therewith, from the memory or mass storage 141*b*. The method 200 is able to proceed with the flow point 240.

At a flow point 240, the local library 141 is ready to send the encrypted digital content 111 to the player equipment 143.

At a step 241, the local library 141 retrieves the encrypted digital content 111, and optionally at least some unencrypted metadata associated therewith, from the memory or mass storage 141*b*.

At a step 242, the local library 141 sends that encrypted digital content 111 from the memory or mass storage 141*b*, using the local network 142, to the player equipment 143.

As a result of performing the steps following the flow point 240, the player equipment 143 is able to access the encrypted digital content 111. The method 200 is able to proceed with the flow point 250.

At a flow point 250, the player equipment 143 is ready to present the encrypted digital content 111 to the user 150.

At a step 251, the player equipment 143 receives the encrypted digital content 111, using the local network 142, from the memory or mass storage 141*b*.

At a step 252, the player equipment 143 receives a set of commands or requests from the user 150.

At a step 253, the player equipment 143 performs those commands or requests from the user 150 capable of being performed without reference to encrypted elements of the decoded digital content 111, without performing any decryption on that decoded digital content 111. As part of this step, the player equipment 143 might perform one or more of the following sub-steps:

At a sub-step 253*a*, the player equipment 143 might rewind, fast forward, or otherwise "seek" to a selected location within the digital content 111.

At a sub-step 253*b*, the player equipment 143 might pause or halt presentation of the media stream represented by the digital content 111.

At a step 254, the player equipment 143 performs those commands or requests from the user 150 to perform the media stream represented by the digital content 111. To perform this step, the player equipment 143 performs the following sub-steps:

At a sub-step 254a, the player equipment 143 decodes the digital content 111, with the effect of obtaining metadata describing presentation of the media stream, and encrypted data for presentation of the actual audio and video associated with the media stream.

At a sub-step 254b, the player equipment 143 sends encrypted digital content 111 to a supplemental device (or a secure sub-system) for decryption.

At a sub-step 254c, the player equipment 143 receives decrypted digital content 111 from the supplemental device (or the secure sub-system) after decryption.

At a sub-step 254d, the player equipment 143 presents the media stream in response to the decrypted digital content 111.

At a flow point 260, the player equipment 143 is ready to respond to further commands from the user 150, and is able to proceed with the flow point 250.

Alternative Embodiments

The invention is useful for, and has sufficient generality for, applications other than distribution of media streams, and to other than distribution of digital content. For example, the invention is also generally useful for applications in which security of datasets or identifying recipients of those datasets is desired.

Although preferred embodiments are disclosed herein, many variations are possible which remain within the concept, scope, and spirit of the invention. These variations would become clear to those skilled in the art after perusal of this application.

As noted above, the invention is not restricted to movies, but is also applicable to other media streams, such as for example animation or sound, as well as to still media, such as for example pictures or illustrations, and to databases and other collections of information.

Those skilled in the art will recognize, after perusal of this application, that these alternative embodiments are illustrative and in no way limiting.

The invention claimed is:

1. A method, comprising:
    importing, by a processor, a media stream having an encrypted portion;
    decrypting said encrypted portion;
    encoding said media stream into digital content, wherein said encoding comprises:
        encrypting a portion of that digital content, less than the entire digital content, the portion of the digital content that is encrypted being required for presentation of the media stream, said encrypting comprising:
            encrypting at least some audio or video data using a block-substitution cipher;
            not encrypting at least some audio or video data using that block-substitution cipher;
            identifying a first set of data and a second set of data in the digital content; and
            encrypting the first set of data and the second set of data, such that the first set of data can be made available to a first set of users and the second set of data can be made available to a second set of users, the first set of users being distinguishable from the second set of users; and
    not encrypting a portion of that digital content, less than the entire digital content, the portion of the digital content that is not encrypted being necessary for conducting navigation operations on, without decrypting, the media stream represented by the digital content.

2. A method as in claim 1, wherein
    said steps of encoding provide an MPEG encoding of at least some video data.

3. A method as in claim 1, wherein said encrypting said portion further comprises:
    refraining from encrypting formatting information.

4. A method as in claim 1, wherein said digital content includes at least some audio or video data and at least some formatting information.

5. A method as in claim 1, wherein
    the digital content includes a set of layers, each relatively higher-level layer representing an abstraction for which each relatively lower-level layer represents an implementation thereof
    a first set of relatively higher-level layers represent audio or video information for the media stream, while a second set of relatively lower-level layers represent techniques by which that information is formatted or supplemented; and
    the step of encrypting is applied only to that portion of the digital content representing audio and video information.

6. A method as in claim 1, wherein
    the digital content includes a set of layers, each relatively higher-level layer representing an abstraction for which each relatively lower-level layer represents an implementation thereof;
    a first set of relatively higher-level layers represent audio or video information for the media stream, while a second set of relatively lower-level layers represent techniques by which that information is broken into packets, indexed, multiplexed, or supplemented with metadata; and
    the step of encrypting is applied only to that portion of the digital content representing audio and video information.

7. A method as in claim 1, wherein
    the digital content includes a set of layers, each relatively higher-level layer representing an abstraction for which each relatively lower-level layer represents an implementation thereof;
    a first set of relatively higher-level layers represent audio and video information for the media stream, while a second set of relatively lower-level layers represent techniques by which that information is broken into packets, indexed, multiplexed, or supplemented with metadata; and
    the step of encrypting is not applied to that portion of the digital content representing other than audio and video information.

8. A method as in claim 1, wherein the media stream includes at least one of: still media, an illustration.

9. A method as in claim 1, including steps of selecting that portion of the digital content for encryption so there is no substantial change in distribution of that digital content.

10. A method as in claim 9, wherein said steps of selecting include ensuring there is no substantial change in packetization of a set of digital data in that digital content.

11. A method as in claim 9, wherein said steps of selecting include ensuring there is no substantial change in synchronization of audio with video portions of the media stream.

12. A method as in claim 9, wherein said steps of selecting include ensuring there is no substantial change in length of at least some identifiable audio or video data in that digital content.

13. A method, comprising:
importing, by a processor, a media stream having an encrypted portion;
decrypting said encrypted portion;
encoding said media stream into digital content, that digital content having a set of information nodes, those information nodes being disposed in at least a partial ordering, said encoding comprising:
  encrypting a portion of that digital content, less than the entire digital content, the portion of the digital content that is encrypted being required for presentation of the media stream, said encrypting comprising:
    encrypting at least some audio or video data using a block-substitution cipher;
    not encrypting at least some audio or video data using that block-substitution cipher;
    identifying a first set of data and a second set of data in the digital content; and
    encrypting the first set of data and the second set of data, such that the first set of data can be made available to a first set of users and the second set of data can be made available to a second set of users, the first set of users being distinguishable from the second set of users; and
  wherein an unencrypted portion of that digital content is substantially closed in a direction under that partial ordering, whereby it is possible to navigate the encrypted portion of that digital content without having to decrypt it.

14. A method as in claim 1, wherein those navigation operations include at least one of: a rewind operation, a fast forward operation, a movement operation to a selected location within the digital content, a pause operation, a halt operation.

15. A method as in claim 1, wherein the encrypted version of that digital content is substantially unchanged in formatting parameters from an unencrypted version of that digital content.

16. A method as in claim 1, farther comprising:
encrypting substantially all of that digital content using an encryption approach relatively less secure than said encrypting said portion of that digital content.

17. A method as in claim 1, wherein said encrypting said portion further comprises:
encrypting only packet payloads when said digital content is one of the group: an MPEG encoding, a variant of an MPEG encoding.

18. A method as in claim 1, wherein said decrypting comprises decrypting only formatting information within that digital content.

19. A method as in claim 1, wherein said decrypting comprises not decrypting metadata.

20. A method as in claim 1, wherein said decrypting comprises not decrypting data necessary for browsing or searching within a library of files.

21. A method as in claim 13, further comprising:
encrypting substantially all of that digital content using an encryption approach relatively less secure than said encrypting said portion of that digital content.

22. A method as in claim 13, wherein the encrypted version of that digital content is substantially unchanged in formatting parameters from an unencrypted version of that digital content.

23. A method as in claim 13, wherein those navigation operations include at least one of: a rewind operation, a fast forward operation, a movement operation to a selected location within the digital content, a pause operation, a halt operation.

24. A method as in claim 13, wherein said encrypting said portion further comprises:
encrypting only packet payloads when the digital content is one of the group: an MPEG encoding, a variant of an MPEG encoding.

25. A computer-readable storage medium having computer-executable instructions for performing steps comprising:
importing, by a processor, a media stream having an encrypted portion;
decrypting said encrypted portion;
encoding said media stream into a digital content format representing that media stream, said encoding comprising:
  encrypting a portion of that digital content, less than the entire digital content, the portion of the digital content that is encrypted being required for presentation of the media stream, said encrypting comprising:
    encrypting at least some audio or video data using a block-substitution cipher;
    not encrypting at least some audio or video data using that block-substitution cipher;
    identifying a first set of data and a second set of data in the digital content; and
    encrypting the first set of data and the second set of data, such that the first set of data can be made available to a first set of users and the second set of data can be made available to a second set of users, the first set of users being distinguishable from the second set of users; and
wherein a portion of that digital content, less than the entire digital content, is not encrypted, the portion of the digital content that is not encrypted being necessary for conducting navigation operations on, without decrypting, the media stream represented by the digital content.

26. A computer-readable storage medium as in claim 25, wherein said encrypting comprises refraining from encrypting formatting information.

27. A computer-readable storage medium as in claim 25, wherein the media stream includes at least one of: still media, an illustration.

28. A computer-readable storage medium as in claim 25, further comprising:
selecting that portion of the digital content for encryption so there is no substantial change in distribution of that digital content.

29. A computer-readable storage medium as in claim 28, further comprising:
ensuring there is no substantial change in packetization of a set of digital data in that digital content.

30. A computer-readable storage medium as in claim 28, farther comprising:
ensuring there is no substantial change in synchronization of audio with video portions of the media stream.

31. A computer-readable storage medium as in claim 28, farther comprising:
ensuring there is no substantial change in length of at least some identifiable audio or video data in that digital content.

32. A computer-readable storage medium having computer-executable instructions for performing steps comprising:
  importing, by a processor, a media stream having an encrypted portion;
  decrypting said encrypted portion;
  encoding said media stream into digital content, that digital content having a set of information nodes, those information nodes being disposed in at least a partial ordering;
  encrypting a portion of that digital content, the portion being encrypted less than the entire digital content format representing that media stream, the portion of the digital content that is encrypted being required for presentation of the media stream, said encrypting comprising:
    encrypting at least some audio or video data using a block-substitution cipher;
    not encrypting at least some audio or video data using that block-substitution cipher;
    identifying a first set of data and a second set of data in the digital content; and
    encrypting the first set of data and the second set of data, such that the first set of data can be made available to a first set of users and the second set of data can be made available to a second set of users, the first set of users being distinguishable from the second set of users; and
  wherein an unencrypted portion of that digital content is substantially closed in a direction under that partial ordering, whereby it is possible to navigate the encrypted portion of that digital content without having to decrypt it.

33. A computer-readable storage medium as in claim 32, further comprising:
  encrypting substantially all of that digital content using an encryption approach relatively less secure than said encrypting said portion of that digital content.

34. A computer-readable storage medium as in claim 32, further comprising:
  encrypting only packet payloads when the digital content is one of the group: an MPEG encoding, a variant of an MPEG encoding.

* * * * *